United States Patent [19]

Kawamura et al.

[11] Patent Number: 4,713,701

[45] Date of Patent: Dec. 15, 1987

[54] PICTURE PRODUCING APPARATUS USING MULTIPLE DOT FORMING UNITS AND RECORDING MATERIALS OF DIFFERENT CONCENTRATIONS

[75] Inventors: Hideaki Kawamura, Tokyo; Nobuaki Sakurada, Yokohama; Yuichi Sato, Kawasaki; Yoshitaka Watanabe, Tokyo, all of Japan

[73] Assignee: Canon Kabushiki Kaisha, Tokyo, Japan

[21] Appl. No.: 844,244

[22] Filed: Mar. 24, 1986

Related U.S. Application Data

[63] Continuation of Ser. No. 530,474, Sep. 8, 1983, abandoned.

[30] Foreign Application Priority Data

Sep. 18, 1982 [JP] Japan ................... 57-162662

[51] Int. Cl.$^4$ ............................................. H04N 1/40
[52] U.S. Cl. ................... 358/298; 346/140 R; 358/75
[58] Field of Search ................ 346/1.1, 75, 140; 358/75, 80, 298

[56] References Cited

U.S. PATENT DOCUMENTS

| | | |
|---|---|---|
| 1,656,338 | 1/1928 | Ranger . |
| 1,790,723 | 2/1931 | Ranger . |
| 1,817,098 | 8/1931 | Ranger . |
| 3,404,221 | 10/1968 | Loughren ............................. 358/75 |
| 3,681,650 | 8/1972 | Koll . |
| 3,683,212 | 8/1972 | Zoltan . |
| 3,747,120 | 7/1973 | Stemme . |
| 3,864,696 | 2/1975 | Fischbeck ............................ 346/140 |
| 3,961,306 | 6/1976 | Anstey . |
| 3,977,007 | 8/1976 | Berry . |
| 4,050,077 | 9/1977 | Yamada . |
| 4,272,771 | 6/1981 | Furakawa . |
| 4,339,774 | 7/1982 | Temple . |
| 4,342,051 | 7/1982 | Suzaki et al. . |
| 4,353,079 | 10/1982 | Kawanabe . |
| 4,368,491 | 1/1983 | Saito . |
| 4,389,712 | 6/1983 | Frattarola . |
| 4,394,693 | 7/1983 | Shirley . |
| 4,403,874 | 9/1983 | Payne .............................. 358/78 X |
| 4,412,225 | 10/1983 | Yoshida et al. . |
| 4,412,226 | 10/1983 | Yoshida . |
| 4,413,275 | 11/1983 | Horiuchi ............................. 358/75 |
| 4,446,470 | 5/1984 | Sugiyama ........................... 346/140 |
| 4,468,706 | 8/1984 | Cahill . |
| 4,494,128 | 1/1985 | Vaught .............................. 346/140 |
| 4,499,479 | 2/1985 | Lee .................................. 346/140 |
| 4,533,920 | 8/1985 | Suzuki .............................. 346/1.1 |
| 4,560,997 | 12/1985 | Sato ................................. 346/140 |
| 4,672,432 | 6/1987 | Sakurada et al. . |

FOREIGN PATENT DOCUMENTS 57-156264 9/1982 Japan .

*Primary Examiner*—Joseph W. Hartary
*Attorney, Agent, or Firm*—Fitzpatrick, Cella, Harper & Scinto

[57] ABSTRACT

A picture producing apparatus forms a picture comprising a plurality of picture elements with different light-reflecting properties providing different optical reflection densities using a plurality of dot forming units to provide dots of recording materials of different concentrations. The optical reflection density range of an entire original picture to be reproduced is determined and selecting circuitry responsive to that determination selects at least one of the dot forming units to form picture elements reproducing the original picture. The dot forming units vary the areas of the picture elements formed by the dots so as to represent in the reproduced picture the optical reflection density range of the original.

8 Claims, 9 Drawing Figures

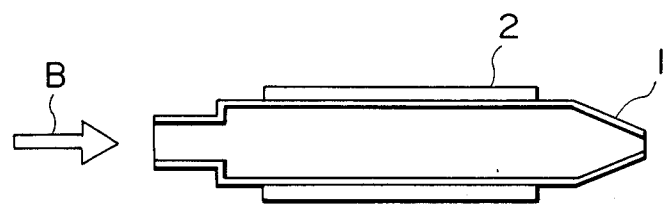
FIG. IA
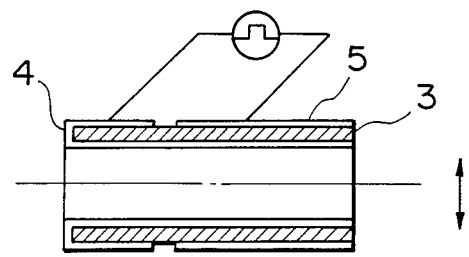
FIG. IB

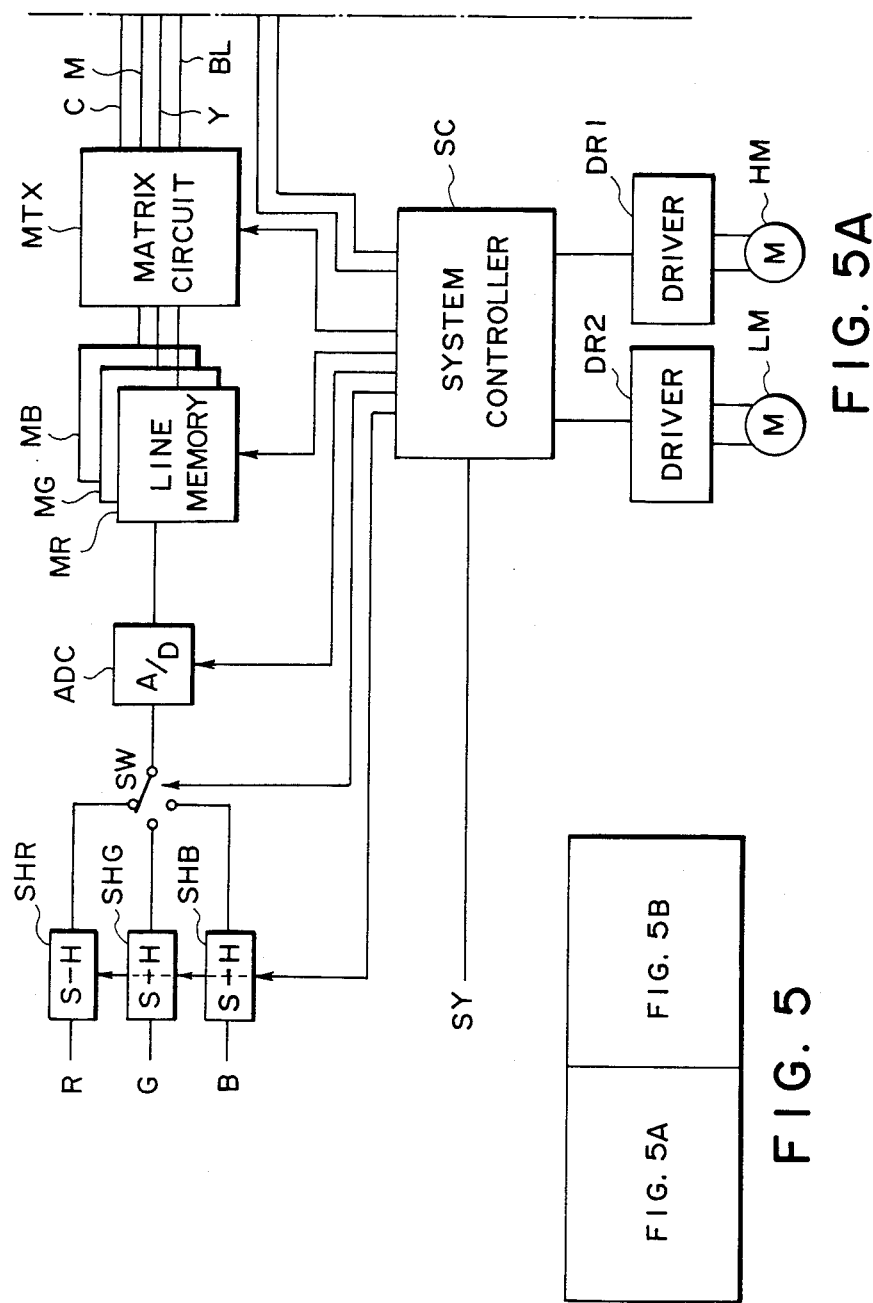

PICTURE PRODUCING APPARATUS USING MULTIPLE DOT FORMING UNITS AND RECORDING MATERIALS OF DIFFERENT CONCENTRATIONS

This application is a continuation of application Ser. No. 530,474 filed Sept. 8, 1983, now abandoned.

BACKGROUND OF THE INVENTION

Field of the Invention

This invention relates to an apparatus for producing a picture by dots and, more particularly, to an apparatus for producing a picture in which the reproduction of a density gradient is possible.

Description of the Prior Art

Various apparatuses which can reproduce a density gradient have been conventionally proposed. For convenience, the present invention will be described in detail hereinbelow using a an example an ink jet printer.

The following methods of reproducing a density gradient have been proposed conventionally.

A first method is to reproduce the density gradient by varying the dot diameter size to be printed by controlling the quantity of liquid discharged from the ink jet head.

As a second method, the dot diameter is not changed but one picture element (i.e. pixel) is constituted by a matrix consisting of, for example, micro-elements of 4×4 and the density gradient is reproduced using a dither process for this matrix.

However, according to the first method, it is difficult to take a wide range from the minimum dot diameter to the maximum dot diameter and thus only the reproduction of the order of several density gradients can be done. Thus, this method is unsatisfactory for printout of television pictures or photographs, or the like.

The second method eliminates the drawback in the first method, and if one pixel is constituted by the matrix of 4×4, seventeen density gradients can be reproduced. However, an increase of one pixel by 4×4=16 times larger than that in the first method causes the print speed to be reduced to 1/16, or the print speed must be made fast by increasing the number of print heads by 16 times. However, this countermeasure not only makes the construction of the print head complicated but also greatly increases the complexity of the electric circuit for processing pictures by means of the dither process, resulting in an extreme increase in overall cost.

To eliminate such prior art drawbacks, the present applicant has proposed an ink jet printer which uses a plurality of inks with different tinting densities and can cover a wide density range with a simple construction by controlling the dot diameter with respect to each ink in U.S. Ser. No. 491,654, filed on May 5, 1983.

On the other hand, in such an ink jet printer, the diameter of the print dot which can be formed by the ink jet head is 70–280 $\mu$m when a certain type of head is used. To obtain a high density gradient by varying this dot size, the maximum dot diameter of about 200–280 $\mu$m is needed. If the overlapped area is set to be small, a pixel is constituted by 4–6 dots/mm (dot/mm is referred to as PEL hereinbelow). While, for example, in a video printer which obtains reproduction pictures from television signals, the number of scanning lines of one frame of the television signal is 525 in case of NTSC system, so that the number of pixels is 525×(525×4/3) and the number of pixels in the effective screen among them is approximately 480×640 dots.

Therefore, when the screen is constituted by 5 PELs, the screen size becomes 96×128 mm, this size is suitable for viewing at an ordinary least distance of distinct vision.

When a plurality of tinting density inks are used, two methods are available to obtain the same reflection density: a method forming a small dot with an ink having a high tinting density; and a method forming a large dot with an ink having a low tinting density. However, even if reflection densities were identical, a large difference in the quality of such pictures would be apparent.

That is, when a change-over between high density dots and low density dots is made at a predetermined reflection density, the continuity of the picture is broken at the density change-over point. Therefore an unnatural picture would be produced.

SUMMARY OF THE INVENTION

It is an object of the present invention to provide an apparatus for producing a picture which detects density data in a picture to be recorded and according to the detected density data can select a preferred mode from a first picture recording mode where only high density dots are used, a second mode where only low density dots are used, and third mode where different dots with a plurality of densities are used.

Specifically, it is an object of the present invention to provide an apparatus for producing a picture, which produces the picture by using high density dots when the density range of the picture to be reproduced is in the high density region only, using low density dots when the density range is in the low density region only, and using different density dots when the density range extends from low density region to high density region.

Other objects of the present invention will be more apparent from the following detailed description taken in conjunction with the accompanying drawings.

BRIEF DESCRIPTION OF THE DRAWINGS

FIG. 1A is a cross sectional view of an ink jet head;

FIG. 1B is a cross sectional view of a piezovibrator;

FIGS. 5, 5A and 5B show a control circuit used when the printer as shown in FIG. 3 is applied the a video printer;

DETAILED DESCRIPTION OF THE PREFERRED EMBODIMENT

One specification embodiment of the present invention is described in conjunction with the accompanying drawings, as follows.

Figure 2:
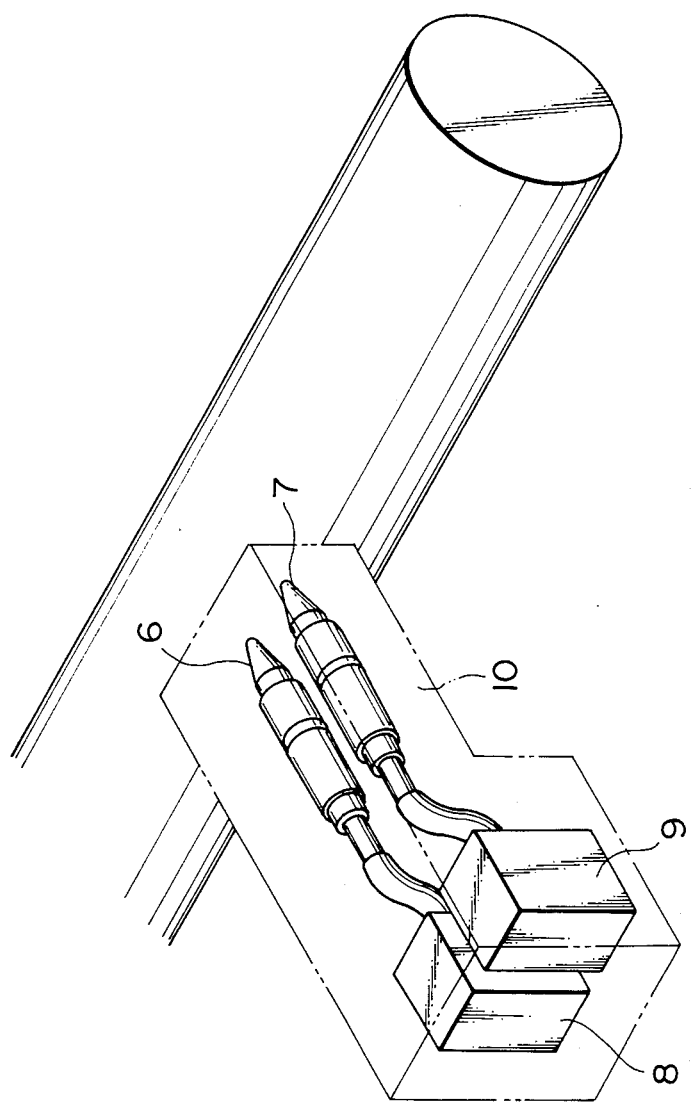
FIG. 2 is a constructional view of the ink jet head.
Figure 3:
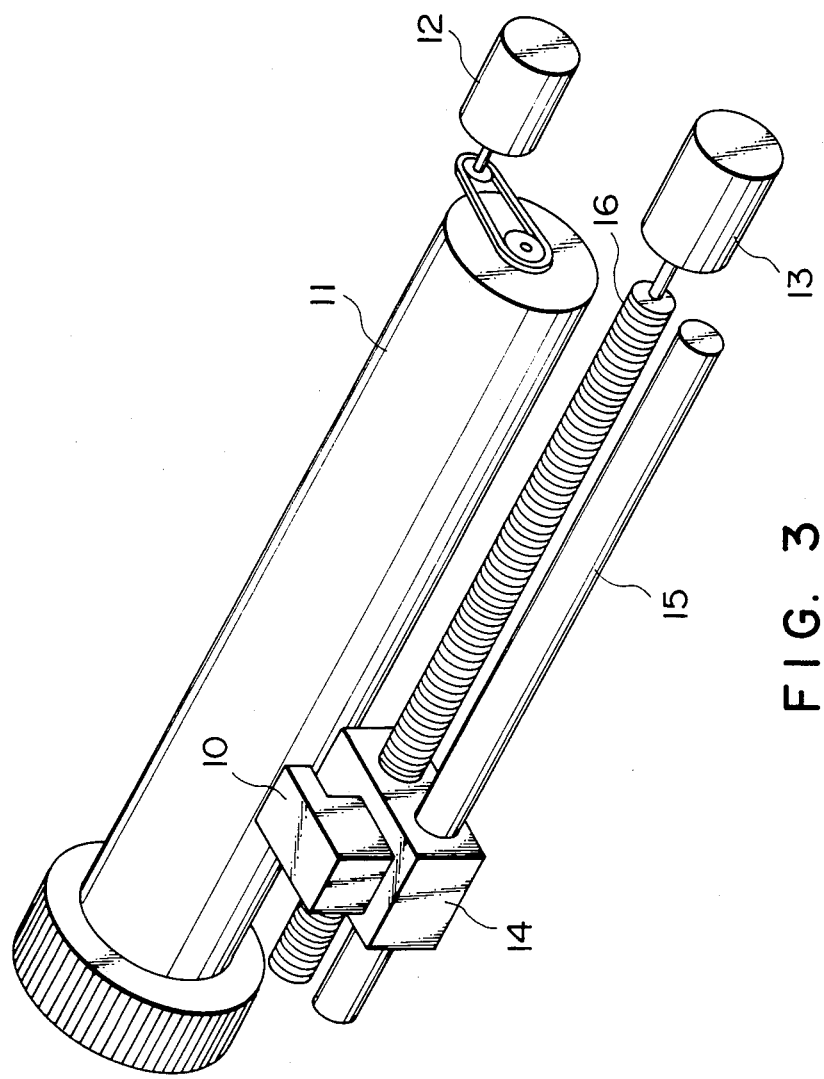
FIG. 3 is a perspective view of a printer to which the head of FIG. 2 was employed.

FIG. 1A is a cross sectional view of the ink jet head shown in this embodiment and FIG. 1B is a cross sectional view showing the construction of a piezovibrator. In the drawings, a glass tube 1 has an elongated point and a piezovibrator 2 coming into contact with the peripheral of the glass tube 1. A reference numeral 3 denotes a tubular piezodevice and reference numerals 4 and 5 indicate electrodes, respectively. A pulse-like voltage is applied between the electrodes 4 and 5, thereby performing contraction and recovery of the tube in the direction of the inside diameter. At this time, by supplying ink from the direction indicated by an arrow B, it is possible to discharge an ink droplet from the elongated point (orifice portion) of the glass tube 1. The size of the discharged ink droplet can be changed in dependence upon the magnitude of the voltage to be applied to this piezodevice. According to our experiments, it was possible to change with respect to the width of about three times larger as the print dot diameter. However, the change in diameter of about three times larger results in about nine times the area ratio, and this is unsatisfactory to represent the density gradient as a picture printer. Therefore, as shown in FIG. 2, an ink jet head unit 10 is constructed which uses two heads 6 and 7 and which is provided with ink tanks 8 and 9 in which inks with different densities (also referred to as "concentrations") are contained, respectively. FIG. 3 is a constructional drawing of the mechanical section of a printer in which the head unit 10 shown in FIG. 2 was installed. In the drawing, a reference numeral 11 denotes a platen; 12 indicates a pulse motor to feed a recording medium, such as paper forms; 13 represents a motor to scan a head carriage 14 on which the head unit 10 was mounted by means of a guide 15 and a screw 16.

An example in the case where a picture was produced using the printer shown in FIGS. 2 and 3 is now described hereinbelow. An average reflection density OD of a pixel in the following description is defined as follows by assuming that the amount of light incidence to be irradiated onto a predetermined area formed by the dots with 5 PEL pitch is $I_i$ and that the amount of reflected light for the amount of light incidence $I_i$ is $I_O$:

$$OD = \log_{10} \frac{I_i}{I_O}$$

In the following embodiment, Direct Blue 86 (color index) was used as ink.

Figure 4:
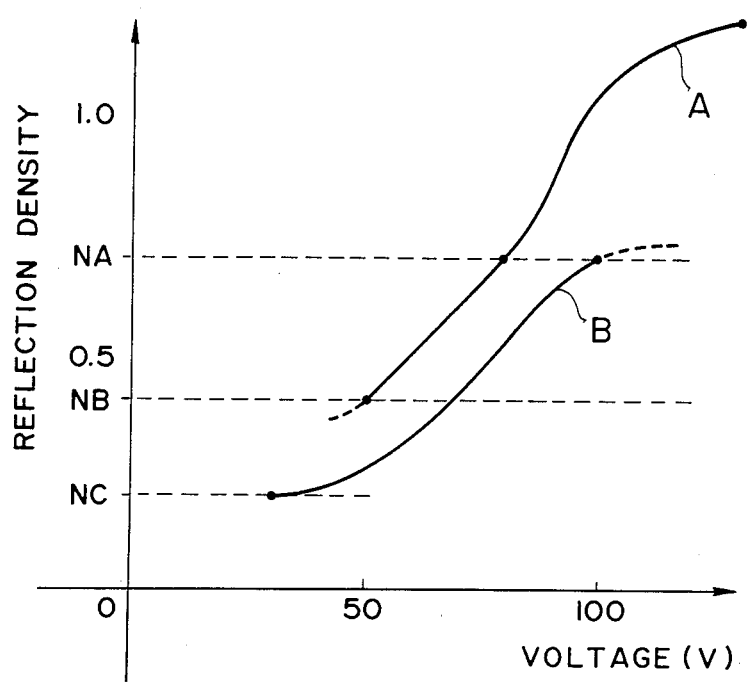
FIG. 4 is a graph showing the characteristics of the voltage applied to the head for the average reflection density.

Printing characteristics as shown in FIG. 4 can be obtained when the printer of FIG. 3 is used. In FIG. 4, vertical axis indicates reflection densities and the horizontal axis indicates the voltages applied to the first and second head. In this graph, a curve (a) indicates the optical reflection density characteristic of a high density concentrated ink and a curve (b) represents the optical reflection density characteristic of a low density rarefied ink. In this experiment, the orifice diameters of glass tubes of both heads are 65 μm. The applied pulse width is 10 μs. With regard to the ink density, the density of dyes supplied to the first head is 0.15%, the density of dyes supplied to the second head 2.0%. Further, the dot space is 5 dots per mm. Under the above conditions, the reflection density was observed. Satisfactory color reproduction could not be performed with varying the density of the same ink. Then, in order to maintain the continuity of the color reproduction for two kinds of ink with a low density and high density they are harmonized in color tone with dyes of eosin and tartrazine and the like, respectively. In this manner, the satisfactory continuous density gradient as shown in FIG. 4 could be achieved.

Figure 5B:
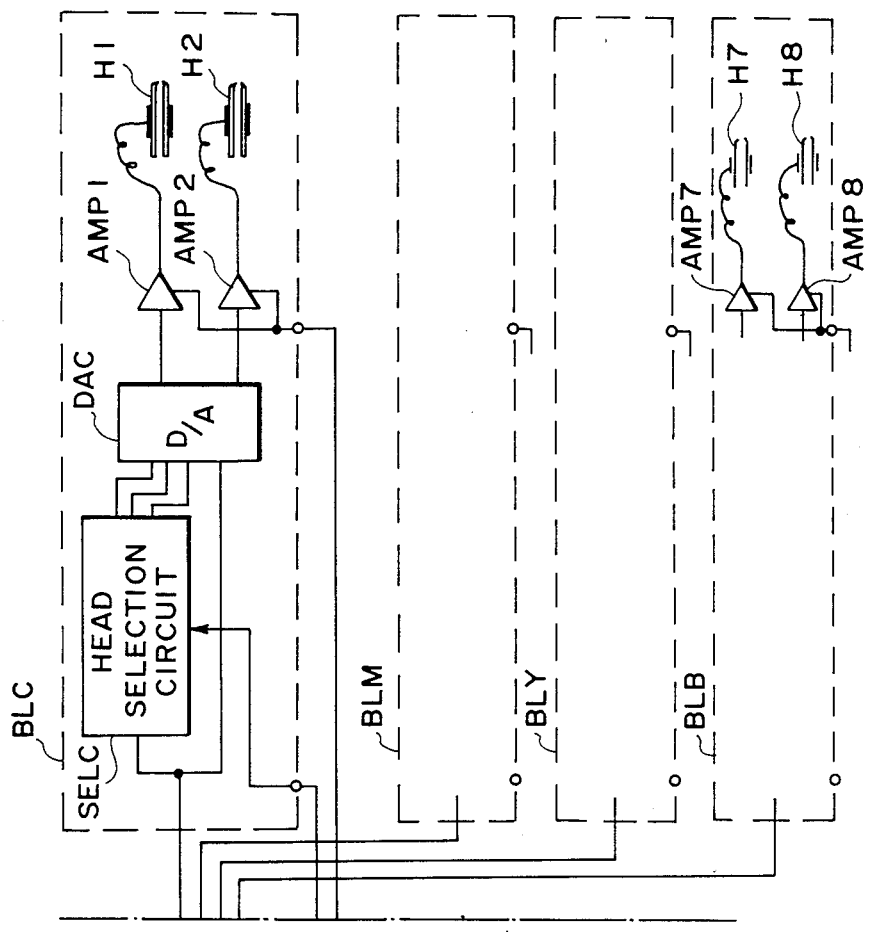

FIG. 5 shows a block diagram of a control circuit used when the printer as shown in FIG. 3 is applied to a video printer for printing out color video signals.

With reference to the drawings, the operation would be described as follows.

The picture signals from R, G and B are first respectively applied to sample and hold circuits SHR, SHG and SHB. On the other hand, a sync. signal SY is applied to a system controller SC. The sampling and holding are performed in accordance with the timing signals from this system controller SC, so that each color video signal is respectively stored in line memories MR, MG and MB through a signal change-over switch SW and an analog-digital converter ADC.

Then a matrix circuit MTX carries out the masking and under color elimination processing on the basis of the information in the line memories MR, MG and MB to produce a cyanic signal C, magenta signal M, yellow signal Y, and black signal BL.

These output signals are applied to DA converters DAC, DAM, DAY, DABL at the time of printing operation to control one selected from ink jet heads H1–H8 through the head drivers AMP1–AMP8. Further, the head feeding and paper feeding are achieved by controlling head motor HM and paper feeding motor LM through drivers DR1 and DR2 in response to a signal from system controller SC.

While, the output from the matrix circuit MTX is also applied to head selection circuits SELC, SELM, SELY and SELPL. Before the recording operation, the density region where the density data of the recording picture resides is detected. Referring to FIG. 4, the density region is separated into four which are a region above NA, a region from NA to NB, a region from NB to NC, and a region below NC. In this case, the data of the density higher than NA can be reproduced only through high density ink. Further, the data of the density from NB to NC can be reproduced only through low density ink. Whether or not the density data reside in the above mentioned two regions is examined over the whole of a picture to be recorded. One among a first mode for recording a picture with high density ink only, second mode with low density ink only, and third mode with both high and low density inks is selected. This mode selection signal is applied to DA converters DAC, DAM, DAY, DABL. Thus, the kind (high or low density) of ink and the voltage to be applied to the head are uniquely determined in accordance with the density data which is another input data of DA converter.

Figure 6:
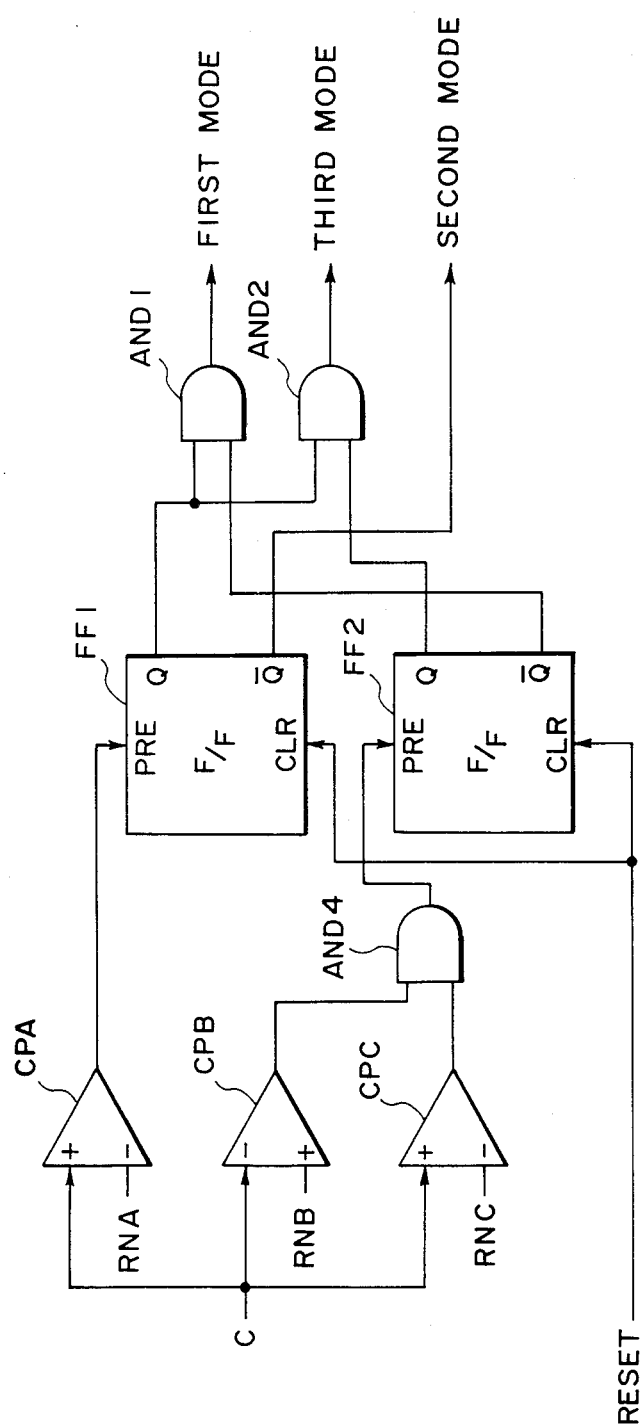
FIG. 6 shows the details of the head selection circuit included in the control circuit of FIG. 5.

The details of the head selection circuit will be described with reference to FIG. 6. The head selection circuit as shown in FIG. 6 is provided for each color of cyan, magenta, yellow and black. FIG. 6 shows an embodiment of head selection circuit for cyan. Although the illustrated circuit has a specific wired-logic configuration, it is possible to realize the alternative by using a micro-processor loaded by a particular software. As an initial step, output signal RESET from system controller SC is applied to clear terminals of flip-flops FF1 and FF2 to produce "L" (logical low level signal) at their outputs Q. Output C from matrix circuit MTX is applied to comparators CPA, CPB and CPC to be compared with reference voltages RNA, RNB and RNC respectively corresponding densities NA, NB and NC of FIG. 4. When the density is higher than NA, the output of comparator CPA becomes "H" (logical high level signal); when higher than NB, the output of comparator CPB "L"; and when higher than NC, the output of comparator CPC "H". Accordingly, a density level which ranges within NB through NC causes comparators CPB and CPC to produce outputs of "H" so that output Q of flip-flop FF2 is set to "H" through the output of AND gate AND4. Similarly, a density level higher than NA sets flip-flop FF1 so that output Q of FF1 is set to "H". Flip-flops FF1 and FF2 are not reset until the check for one picture of image data has been completed. As the whole of one picture has been checked, the mode selection is conducted. When the Q output of FF1 is "H" and the $\bar{Q}$ output is "L", since there is no density data capable of being reproduced only through the low density ink, the output of AND1 becomes "H" so that the first mode is selected. Similarly, when both outputs of FF1 and FF2 are "H", since there are density data capable of being reproduced only through the high density ink and also density data capable of being reproduced only through the low density ink, the output of AND2 becomes "H" so that the third mode is selected. When the Q output of FF1 is "L", since there is no density data capable of being reproduced only through the high density ink, the second mode is selected. Accordingly, even where density data resides within the overlapping region only, which can be reproduced through the low density ink and still through the high density ink, the low density ink is selected. The ink selection for the overlapping region in the third mode is predetermined.

Although the foregoing description is directed only to the head selection circuit for cyan ink, the control circuits for magenta, yellow and black can be constructed in a similar configuration.

Although, in this embodiment, the example using two kinds of higher density and lower density dots has been explained, it will be easily understood that dots having three or more kinds of different densities can be applicable to the present invention.

Though the example of the ink jet printer has been described in this specification, the present invention is not limited to this but can be applied to all dot printer which can reproduce the various densities even in an electrophotographical printer, electrostatic printer, thermal printer, etc.

It is needless to say that the present invention can be applied to a recording method and an apparatus therefore which are set forth in, for example, the specification of U.S. Pat. No. 3,946,398, DE Laid-open official Gazette No. 2843064, DE Laid-open Official Gazette No. 2944005, etc. Although circular dots have been used to explain one preferred embodiment, the dot shape is not limited to this and the present invention can be applied to any dots having various shapes.

As described in the foregoing, the picture producing apparatus comprises a plurality of dot forming means, each of them forming micro-dots with a different density from others, means for detecting density data in a picture to be recorded and means in response to the output from the detection means for selecting ones among the plurality of dot forming means for use in a picture production. With the above mentioned apparatus, a plurality of dot forming means are used for a recording picture wherein the density data extends over a wide range from low density to high density so that a high gradient picture may be reproducted. And also, where the density data is one-sided toward high density or low density, the picture reproduction can be performed through dots with a predetermined density only so that the problem of discontinuity in a reproduced picture due to the changeover between high density dots and low density dots may be resolved.

Although the present invention has been shown and described with respect to a particular embodiment, various changes and modifications which will occur to those skilled in the art to which the invention pertains also lie within the spirit and scope of the invention.

What we claim is:

1. Picture producing apparatus for forming a picture comprising a plurality of picture elements with different light-reflecting properties providing different optical reflection densities, the apparatus comprising:

a plurality of dot forming units for providing dots of recording material on a medium to form the picture elements, said dot forming units providing dots of a particular color using recording materials with different concentrations, wherein said plurality of dot forming units includes a first dot forming unit capable of providing dots having an optical density in a first range and a second dot forming unit capable of providing dots having an optical density in a second range at least partially overlapping the first range;

determining means for determining the optical reflection density limits of a plurality of original picture elements of an original to be reproduced corresponding to picture elements of the picture to be produced; and selecting means responsive to said determining means for selecting only said first dot forming unit to form picture elements when the optical reflection density limits of the original picture elements are within the first optical reflection density range, only said second dot forming unit to form picture elements when the optical reflection density limits of the original picture elements are within the second optical reflection density range, and said first and said second dot forming units to form picture elements when the optical reflection density limits of the original picture elements extend over the first and second optical reflection density ranges.

2. Picture producing apparatus according to claim 1, wherein the recording materials are liquid inks and said plurality of dot forming units include ink jet recording devices.

3. Picture producing apparatus according to claim 1, wherein each dot forms one picture element.

4. Picture producing apparatus according to claim 1, wherein said first and second dot forming units are capable of modulating the size of each dot such that said first and second dot forming units can form picture elements having optical reflection density ranges that enable reproduction of the entire range of optical reflection densities of the plurality of original picture elements.

5. Picture producing apparatus according to claim 4, wherein each dot forms one picture element.

6. Picture producing apparatus for forming a picture comprising a plurality of picture elements with different light-reflecting properties providing different optical reflection densities, the apparatus comprising:

a plurality of dot forming units for providing dots of recording material on a medium to form the picture elements, said dot forming units providing variable-size dots of a particular color using recording materials with different concentrations, wherein said plurality of dot forming units includes a first dot forming unit capable of providing dots having an optical density in a first range by varying the sizes of the dots and a second dot forming unit capable of providing dots having an optical density in a second range at least partially overlapping the first range by varying the sizes of the dots;

determining means for determining the optical reflection density limits of a plurality of original picture elements of an original to be reproduced corresponding to picture elements of the picture to be produced; and selecting means responsive to said determining means for selecting only said first dot forming unit to form picture elements when the optical reflection density limits of the original picture elements are within the first optical reflection density range, only said second dot forming unit to form picture elements when the optical reflection density limits of the original picture elements are within the second optical reflection density range, and said first and said second dot forming units to form picture elements when the optical reflection density limits of the original picture elements extend outside the overlapping region of the first and second optical reflection density ranges.

7. Picture producing apparatus according to claim 6, wherein the recording materials are liquid inks and said plurality of dot forming units include ink jet recording devices.

8. Picture producing apparatus according to claim 6, wherein each dot forms one picture element.

* * * * *

UNITED STATES PATENT AND TRADEMARK OFFICE
CERTIFICATE OF CORRECTION

PATENT NO. : 4,713,701
DATED : December 15, 1987
INVENTOR(S) : HIDEAKI KAWAMURA, ET AL.

It is certified that error appears in the above-identified patent and that said Letters Patent is hereby corrected as shown below:

COLUMN 1

Line 20, "a" should read --as--.

COLUMN 2

Line 52, "the a" should read --to a--.
    Line 67, "peripheral" should read --periphery--.

COLUMN 4

Line 25, "While, the" should read --The--.
    Line 27, "SELPL." should read --SELBL.--.
    Line 63, "corresponding densities" should read --corresponding to densities--.

COLUMN 5

Line 39, "printer" should read --printers--.

Signed and Sealed this

Nineteenth Day of July, 1988

Attest:

DONALD J. QUIGG

*Attesting Officer*    *Commissioner of Patents and Trademarks*